United States Patent
Wright et al.

(10) Patent No.: US 9,008,298 B2
(45) Date of Patent: Apr. 14, 2015

(54) AUTOMATIC DENIAL OF CALL REQUEST

(75) Inventors: Stephen Wright, Suffolk, VA (US); Stuart Langham, Silver Spring, MD (US); Hinal K. Balia, Germantown, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1144 days.

(21) Appl. No.: 12/136,573

(22) Filed: Jun. 10, 2008

(65) Prior Publication Data

US 2009/0304167 A1    Dec. 10, 2009

(51) Int. Cl.
| | |
|---|---|
| *H04M 3/436* | (2006.01) |
| *H04M 1/663* | (2006.01) |
| *H04M 1/725* | (2006.01) |
| *H04M 3/42* | (2006.01) |

(52) U.S. Cl.
CPC .............. *H04M 3/436* (2013.01); *H04M 1/663* (2013.01); *H04M 1/72583* (2013.01); *H04M 3/42059* (2013.01); *H04M 3/42102* (2013.01); *H04M 2203/2011* (2013.01)

(58) Field of Classification Search
USPC .......... 379/124, 210.02, 215.01, 114.14, 188, 379/210.03; 455/456.5, 404.2; 709/203
See application file for complete search history.

(56) References Cited

U.S. PATENT DOCUMENTS

| | | | |
|---|---|---|---|
| 6,920,209 B1* | 7/2005 | Gainsboro | 379/188 |
| 7,231,029 B1* | 6/2007 | Kirkpatrick | 379/210.02 |
| 7,715,544 B1* | 5/2010 | Bilder et al. | 379/215.01 |
| 7,912,192 B2* | 3/2011 | Kealy et al. | 379/114.14 |
| 8,218,752 B1* | 7/2012 | Kirkpatrick | 379/210.02 |
| 2004/0213396 A1* | 10/2004 | MacNamara et al. | 379/210.02 |
| 2007/0041545 A1* | 2/2007 | Gainsboro | 379/188 |
| 2007/0167175 A1* | 7/2007 | Wong et al. | 455/456.5 |
| 2009/0041222 A1* | 2/2009 | Guven | 379/210.02 |

* cited by examiner

*Primary Examiner* — Md S Elahee

(57) ABSTRACT

A method may include receiving, from a network, a call request in a communication device, the call request including an identification of a calling party; notifying a user of the communication device of the call request; receiving an indication to deny the call request; prompting the user of the communication device, in response to receiving the indication to deny the call request, regarding automatically denying call requests having the identification of the calling party; receiving, from the user, an indication to deny call requests having the identification of the calling party; and sending an instruction to the network to automatically deny the call requests having the identification of the calling party.

20 Claims, 14 Drawing Sheets

SUBSCRIPTION TABLE 600-1

| DEVICE ID 602 | SUBSCRIPTION FLAG 604 |
|---|---|
| 555-5656 | TRUE |

652 ⟿

⋮

SUBSCRIPTION TABLE 600-2

| DEVICE ID 602 | SUBSCRIPTION FLAG 604 |
|---|---|
| 555-5656 | TRUE |
| 555-4545 | TRUE |

RULE TABLE 700-1

| | CALLED DEVICE ID 702 | CALLER DEVICE ID 704 | CALLED DEVICE LOCATION 706 | ACTION 708 |
|---|---|---|---|---|
| 750 | 555-5656 | 555-1212 | WORK | REJECT |
| 752 | 555-5656 | 555-9898 | ANY | REJECT |

⋮

RULE TABLE 700-2

| | CALLED DEVICE ID 702 | CALLER DEVICE ID 704 | CALLED DEVICE LOCATION 706 | ACTION 708 |
|---|---|---|---|---|
| 750 | 555-5656 | 555-1212 | WORK | REJECT |
| 752 | 555-5656 | 555-9898 | ANY | REJECT |
| 754 | 555-4545 | 555-3434 | ANY | REJECT |

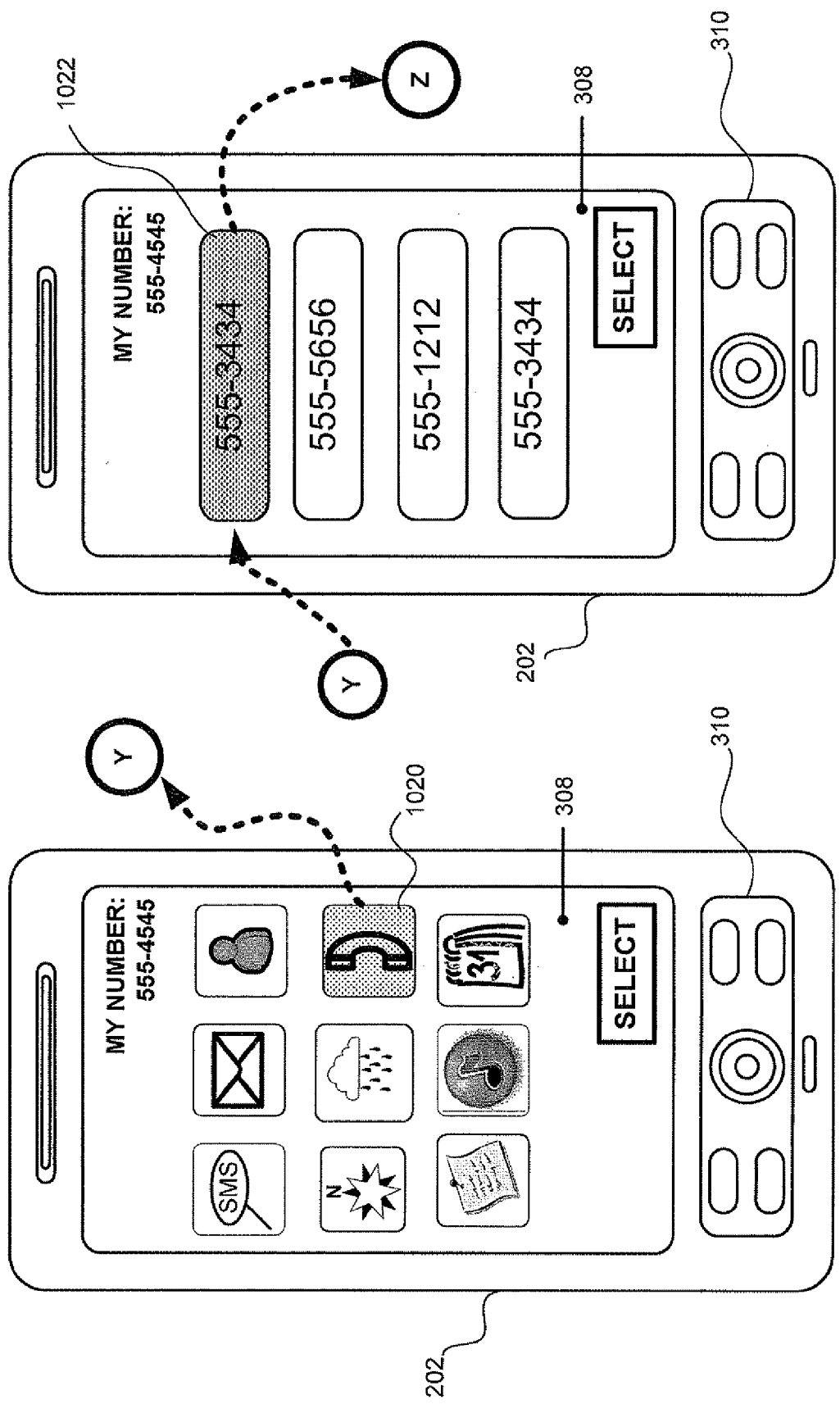

AUTOMATIC DENIAL OF CALL REQUEST

BACKGROUND INFORMATION

A business or person may employ an administrative assistant for answering and screening telephone calls. When a telephone call arrives, the administrative assistant may answer the call and request information from the calling party (such as the calling party's name or number) that may enable the assistant to know whether or not to connect the call to the requested party. The call may ultimately be connected to the requested party or routed to voicemail, for example.

BRIEF DESCRIPTION OF THE DRAWINGS

FIG. 6 is a block diagram of an exemplary subscription table that may be used in one or more embodiments described herein;

FIG. 7 is a block diagram of an exemplary rule table that may be used in one or more embodiments described herein;

FIGS. 10A, 10B, 10C, and 10D are diagrams of exemplary user interfaces for a communication device in one or more embodiments described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
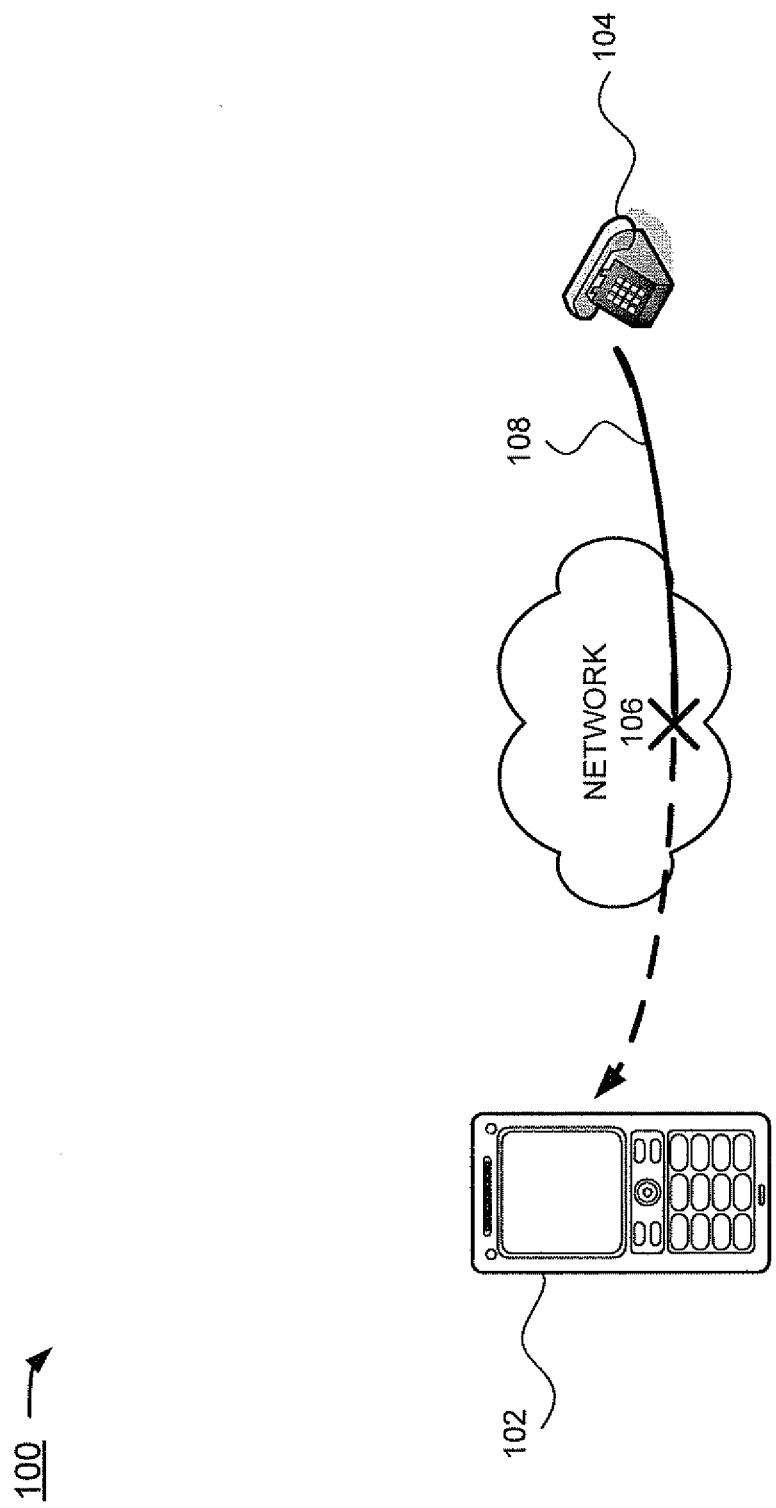
FIG. 1 is a block diagram of an exemplary network in which systems and methods, consistent with one or more embodiments, may be implemented.

One or more embodiments disclosed herein may allow for the automatic blocking (e.g., rejecting or denying) of incoming telephone calls to destination devices from designated origination devices. FIG. 1 is a block diagram of an exemplary network 100 in which systems and methods, consistent with exemplary embodiments, may be implemented. As illustrated, network 100 may include a destination device 102 (e.g., a mobile communication device), an origination device 104 (e.g., a regular telephone), and a network 106 (e.g., a mobile communications network coupled to a public switched telephone network (PSTN)). As shown in FIG. 1, origination device 104 may send a call request 108 to destination device 102 through network 106. Network 106, however, may act on behalf of destination device 102, for example, by automatically denying (represented by an "X") call request 108 from origination device 104.

Figure 2:
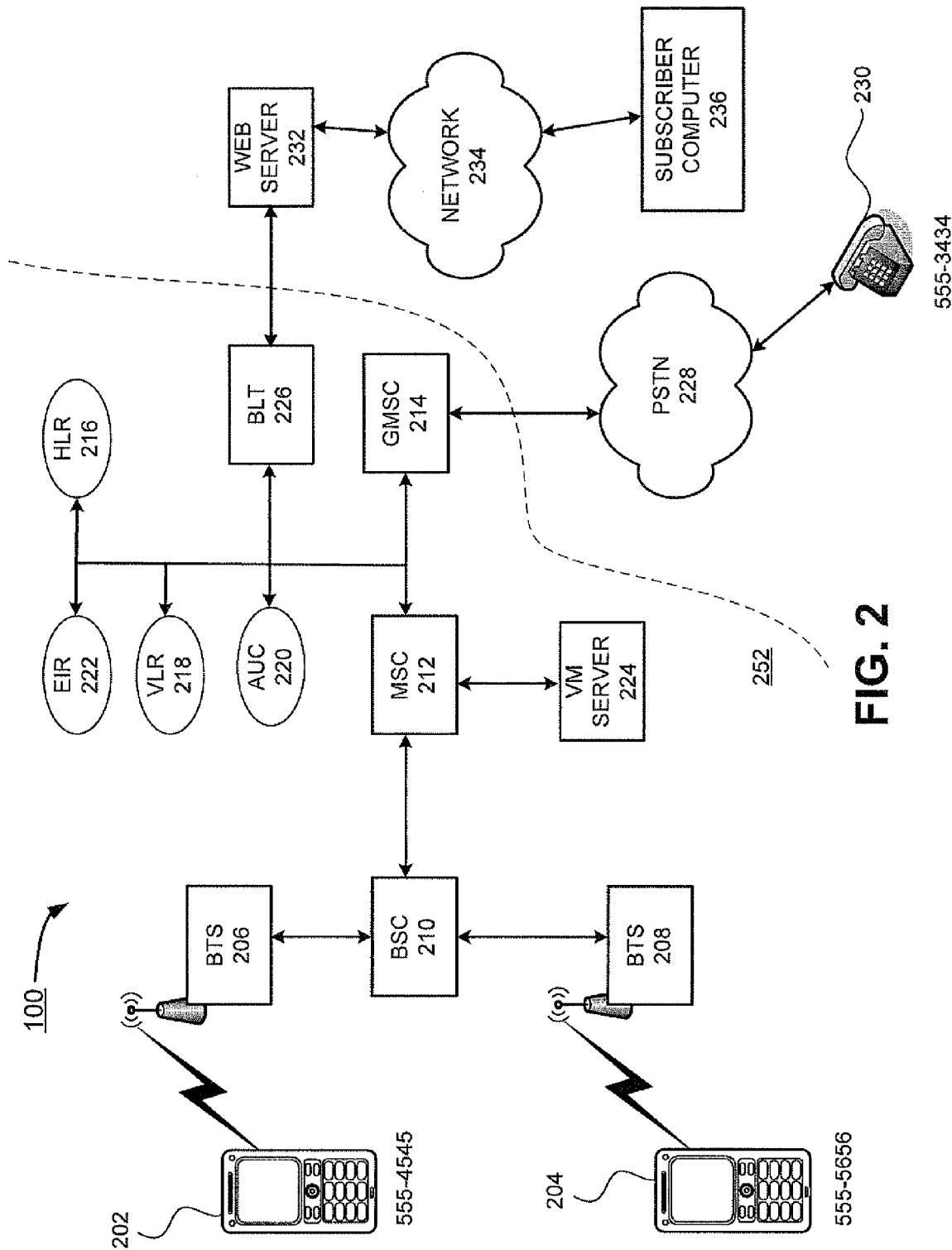
FIG. 2 is a more detailed block diagram of the exemplary network of in which embodiments described herein may be implemented.

FIG. 2 is a more detailed block diagram of exemplary network 100 in which embodiments described herein may be implemented. As shown, network 100 may include communication devices 202 and 204, base transceiver stations (BTSs) 206 and 208, a base station controller (BSC) 210, a mobile switching center (MSC) 212, a gateway mobile switching center (GMSC) 214, a home location register (HLR) 216, a visitor location register (VLR) 218, an authentication center (AUC) 220, an equipment identity register (EIR) 222, a voice-mail (VM) server 224, a blocked list tracker (BLT) 226, a public switch telephone network (PSTN) 228, a phone 230, a web server 232, a network 234, and a subscriber computer 236.

Communication device 202 and/or communication device 204 may correspond to destination device 102 of FIG. 1. Phone 230 may correspond to origination device 104 of FIG. 1. Further, components 206-228 and 232-234 may correspond to network 106 of FIG. 1.

In other embodiments, network 100 may include more, fewer, or different components. For example, network 100 may include an additional MSC 212 or an additional BTS 206. Moreover, one or more components 202-236 may perform one or more functions described as being performed by another component of network 100. Although FIG. 1 shows components 202-236 coupled in a particular configuration, components 202-236 may also be coupled in other configurations. Furthermore, one or more of components 202-236 may be remotely located from each other. Network 100 may include a mobile (e.g., wireless) network 252, which may comprise communication devices 202 and 204, BTSs 206 and 208, BSC 210, MSC 212, GMSC 214, HLR 216, VLR 218, AUC 220, EIR 222, VM server 224, and/or BLT 226. Mobile network 252 may include more fewer, or different components.

Communication devices 202 and/or 204 may include a mobile communications device, such as a wireless device (e.g., a cellular telephone, a personal digital assistant (PDA), etc.). Communication devices 202 and/or 204 may include a personal computer, a laptop, or another type of computation or communication device, a thread or process running on one of these devices, and/or an object executable by one of these devices. In one embodiment, communication devices 202 and/or 204 may include a global positioning system (GPS) unit for determining the location of the device.

BTS 206 and BTS 208 may include devices that are able to receive and transmit wireless and/or wired signals, or any other devices that provide access to a network. BTS 206 and BTS 208 may include radio transceivers that define a mobile communication cell and coordinate radio-link protocols with mobile devices, such as devices 202 and/or 204. In one embodiment, BTS 206 and BTS 208 may implement any GSM (Global System for Mobile communication) standard, CDMA (Code Division Multiple Access) standard, TDMA (Time Division Multiple Access), or IEEE (Institute for Electrical and Electronics) 802 standard.

BSC 210 may control BTS 206 and/or BTS 208. MSC 212 may control BSC 210. MSC 212 may perform signal path searching or signal path switching. For example, if a communication device, such as device 202, requests a connection to a device attached to PSTN 228, such as phone 230, MSC 212 may forward such a request through GMSC 214 to PSTN 228.

GMSC 214 may provide an edge function between PSTN 228 and mobile network 252. GMSC 214 may terminate PSTN signals and/or convert PSTN signals to a protocol employed in mobile network 252. GMSC 214 may receive signals employed in mobile network 252 and may convert signals employed by mobile network 252 into signals employed in PSTN 228.

HLR 216 may store user and/or subscription information related to devices, such as device 202. For example, HLR 216 may store the name of a subscriber, the account number of the subscriber, the type of service contract for the subscriber (e.g., monthly, corporate, pay-as-you-go, etc.), and the service subscriptions to which the user has subscribed (e.g., call waiting, voicemail, etc.). HLR 216 may associate this information with a communication device, such as device 202. HLR 216 may identify communication devices, such as device 202, by a device number, for example. In one embodiment, HLR 216 may store a list of device identifiers (IDs) (e.g., phone numbers, device numbers, account numbers, and/or subscriber names) that have subscribed to a call-blocking feature in mobile network 252.

VLR 218 may store information regarding the status of a communication device, such as where a communication device is located and whether the communication device is turned on. The location of a communication device may be determined by receiving information from a GPS unit in the communication device. The location of the communication device may also be determined by determining the location of the BTS (e.g., BTS 106) with which the called device is communicating.

AUC 220 may store information to authenticate, authorize, and provision access for a communication device, such as device 202, in mobile network 252. For example, AUC 220 may store password and encryption key information associated with devices that may use services provided by mobile network 252.

EIR 222 may store information related to the health of communication devices, such as device 202, that may be permitted to communicate with BTS 206 or BTS 208. For example, EIR 222 may store a list of all communication devices known to be functioning properly. EIR 222 may further store a list of all communication devices that may be defective. EIR 222 may also store a list of all communication devices known not to be defective or known to have been stolen or reported lost, for example.

VM server 224 may include one or more computer systems for hosting programs, databases, and/or applications. VM server 224 may store voice recordings associated with communication devices, such as device 202, associated with mobile network 252, for example. Using a communication device, such as device 202, or a computer, such as subscriber computer 236, a user may access and listen to voice recordings stored in VM server 224. In one embodiment, VM server 224 may also store video messages left for subscribers.

BLT 226 may store a database, e.g., a table, of rules and/or actions that network 252 may implement when receiving call requests. In one embodiment, BLT 226 may store a database, e.g., a table, of caller device IDs and called device IDs that may identify incoming call requests that should be blocked. Device IDs may identify a called device, a called party, a caller party (e.g., calling party), a caller device (e.g., calling device), etc. In another embodiment, BLT 226 may also store a table of device IDs that have subscribed to a call-blocking feature of mobile network 252.

PSTN 228 may allow for phone 230 to communicate with other components in network 100, including communication devices 202 and/or 204. PSTN 228 may include a high-speed fiber optic network, such as Verizon's FiOS (™) network.

Phone 230 may include a POTS (Plain-Old Telephone System) telephone. Phone 230 may also include a wireless device (e.g., a cellular telephone, a PDA, etc.), and/or any other type of device to which voice, video, and/or other types of sessions may be established. Phone 230 may include a Session-Initiation Protocol (SIP) telephone, an Internet Protocol (IP) Multimedia Subsystem (IMS) client, a set top box that provides voice and/or video sessions, and/or other types of telephone/video conferencing devices. Phone 230 may connect to PSTN 228 via wired and/or wireless connections. Phone 230 may include a personal computer, a laptop, or another type of computation or communication device, a thread or process running on one of these devices, and/or an object executable by one of these devices. In one embodiment, phone 230 may include a GPS unit for determining the location of phone 230.

Web server 232 may include one or more computer systems for hosting programs, databases, and/or applications. Web server 232 may run a web server application, such as Apache, to serve web pages when requested. Web server 232 may serve pages including information from, for example, HLR 216, VLR 218, AUC 220, EIR 222, and/or BLT 226. A subscriber may access, update, and/or edit information, for example, identifying parties from which call requests may be automatically blocked.

Network 234 may include the Internet, an ad hoc network, a LAN, a WAN, a MAN, a cellular network, a PSTN, or any other network or combinations of networks. Network 234 may include a high-speed fiber optic network, such as Verizon's FiOS (™) network. Network 234 may allow for subscriber computer 236 to communicate with other components in network 100, including web server 232.

Subscriber computer 236 may include one or more computer systems for hosting programs, databases, and/or applications. Computer 236 may include any computing device, e.g., a laptop, a personal computer, a PDA, a portable music player (PMP), mobile phone, etc. Computer 236 may include a browser application program for navigating the Internet. A subscriber may use computer 236, for example, to log into web server 232, review and change account information.

Figure 3:
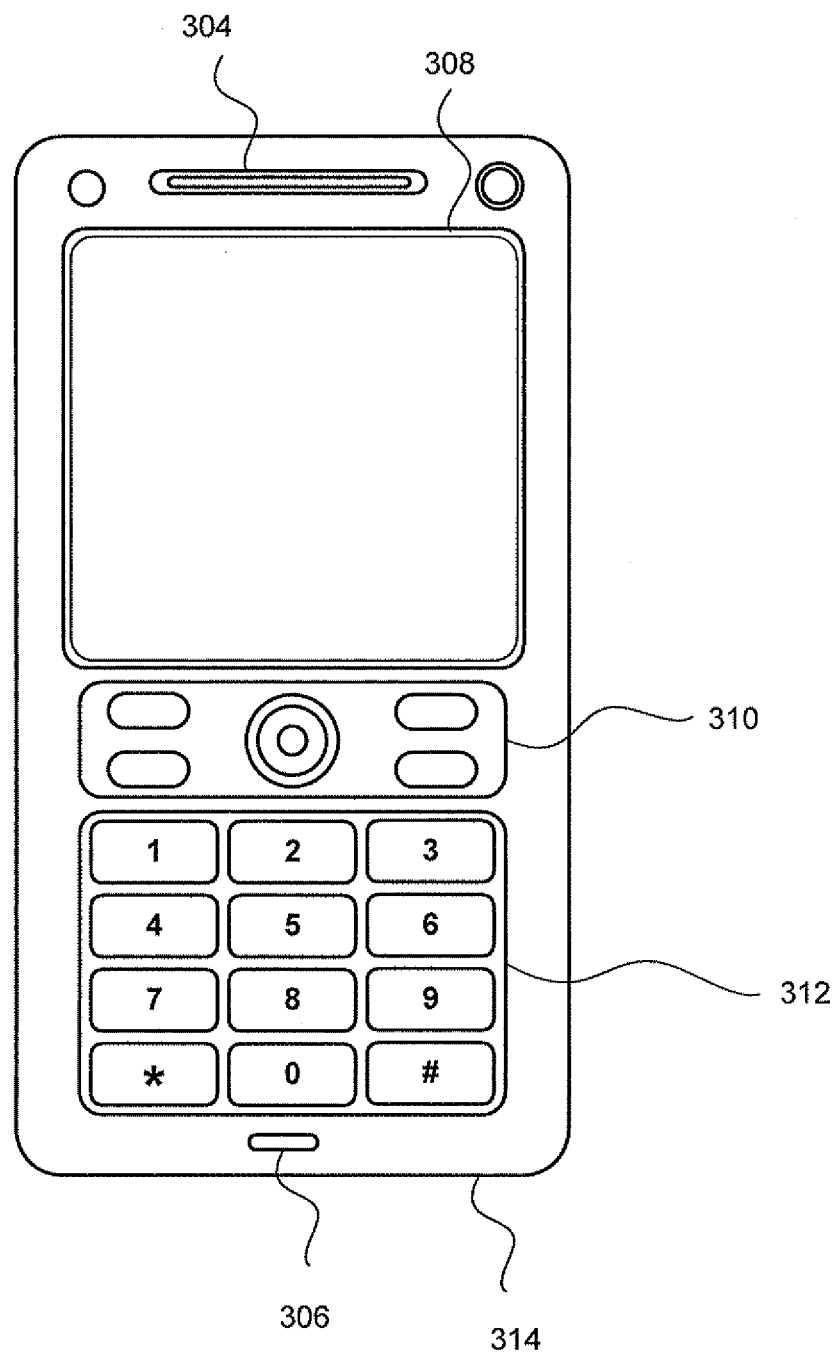
FIG. 3 is a diagram of an exemplary communication device.

FIG. 3 is a diagram of an exemplary communication device, such as communication devices 202 and 204. As illustrated, device 202 may include a speaker 304, a microphone 306, a display 308, control keys 310, a keypad 312, and a housing 314. Device 202 may include other components (not shown in FIG. 3) that aid in receiving, transmitting, and/or processing data. For example, device 202 may include a GPS unit (not shown) for determining the position of device 202. Moreover, other configurations of components in device 202 are possible.

Speaker 304 may provide audible information to a user of device 202. Microphone 306 may receive audible information from the user. Display 308 may include a display screen to provide visual information to the user, such as video images or pictures, and may include a touch screen to accept inputs from a user. For example, display 308 may provide information regarding incoming or outgoing telephone calls, games, telephone numbers, contact information, the current time, e-mail, etc.

Control keys 310 may permit the user to interact with device 202 to cause device 202 to perform one or more operations, such as placing or receiving a telephone call. Control keys 310 may include "soft keys" that may perform the functions indicated on display 308 directly above the keys. Keypad 312 may include a standard telephone keypad and may include additional keys to enable inputting (e.g., typing) information into device 202. Housing 314 may provide a casing for components of device 202 and may protect the components from outside elements.

Figure 4:
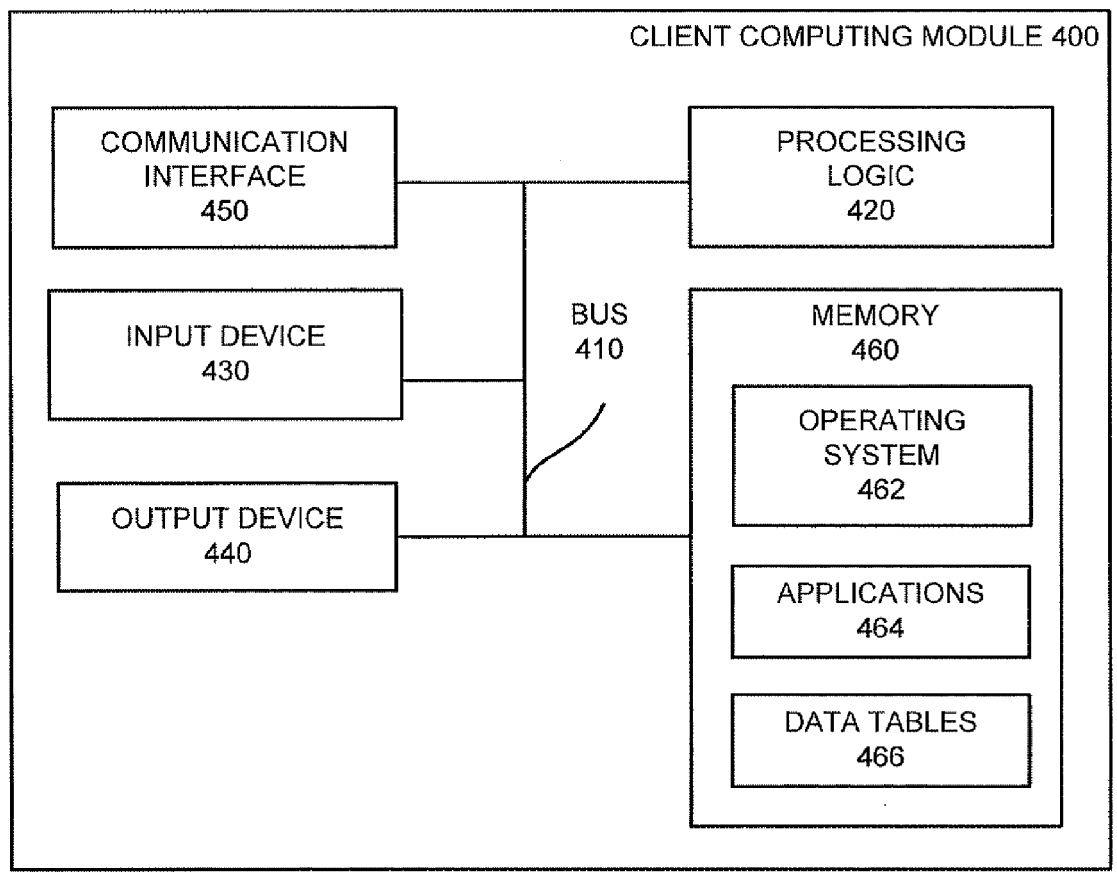
FIG. 4 is a block diagram of exemplary components of a client computing module.

FIG. 4 is a block diagram of exemplary components of a client computing module 400. Communication devices 202 and/or 204, phone 230, and subscriber computer 236, for example, may include one or more client computing modules, such as module 400. Module 400 may include a bus 410, processing logic 420, an input device 430, an output device 440, a communication interface 450, and a memory 460. Memory 460 may include an operating system 462, one or more applications 464, and data tables 466. Module 400 may include other components (not shown) that aid in receiving, transmitting, and/or processing data. Moreover, other configurations of components in module 400 are possible.

Bus 410 may include a path that permits communication among the components of module 400. Processing logic 420 may include any type of processor or microprocessor (or groups of processors or microprocessors) that interprets and executes instructions. In other embodiments, processing logic 420 may include an application-specific integrated circuit (ASIC), a field-programmable gate array (FPGA), or the like.

Input device 430 may include a device that permits a user to input information into module 400, such as a keyboard, a keypad, a mouse, a pen, a microphone, a remote control, a touch-screen display, one or more biometric mechanisms, or the like. In the case of devices 202 and 204, for example, input device 430 may include screen 308 (e.g., a touch screen), microphone 306, keypad 312, and/or control keys 310. In the case of subscriber computer 236, input device 430 may include, for example, a QWERTY keyboard (not shown).

Output device 440 may include a device that outputs information to the user. In the case of devices 202 and 204, for example, output device 440 may include display 308, speaker 304, or a vibrator to alert a user of an incoming call. In the case of subscriber computer 236, output device 440 may include, for example, a monitor (not shown), speakers (not shown), or a printer (not shown).

Communication interface 450 may include any transceiver-like mechanism that enables module 400 to communicate with other devices and/or systems. Communication interface 450 may include a transmitter that may convert baseband signals from processing logic 420 to radio frequency (RF) signals and/or a receiver that may convert RF signals to baseband signals. Alternatively, communication interface 450 may include a transceiver to perform functions of both a transmitter and a receiver. Communication interface 450 may be coupled to an antenna for transmission and reception of the RF signals.

Communication interface 450 may include, for example, a universal serial bus (USB) port for communications over a cable, a Bluetooth wireless interface for communicating with other Bluetooth devices, a near-field communication (NFC) interface, etc. Communications interface 450 may include a wireless network interface (WiFi) card for wireless communications. Communications interface 450 may include, in the case of subscriber computer 236, for example, a network interface card, e.g., Ethernet card, for wired communications.

Memory 460 may include a random access memory (RAM) or another type of dynamic or static storage device that may store information and instructions, e.g., an application, for execution by processing logic 420; a read-only memory (ROM) device or another type of static storage device that may store static information and instructions for use by processing logic 420; and/or some other type of magnetic or optical recording medium and its corresponding drive, e.g., a hard disk drive (HDD), for storing information and/or instructions. As discussed above, memory 460 may include operating system 462, one or more applications 464, and data tables 466.

Operating system 462 may provide a software platform on top of which applications 464 may run. In the case of devices 202 and 204, operating system 462 may include the Binary Runtime Environment for Wireless (BREW), the Blackberry operating system, Symbian, the Palm operating system, Android, Linux, or Windows Mobile, for example.

In the case of devices 202 and 204, data tables 466 may include a table to store a call history of recently placed and/or received calls. Such a table may also include the calling party name, number, time of call, etc. In the case of devices 202 and 204, applications 464 may include an application to determine the location of the device (e.g., using a GPS unit), a call-blocking application (e.g., an application to configure and/or subscribe to a call-blocking feature offered by mobile network 252), or a browser to browse the Internet. In the case of subscriber computer 236, applications 464 may include, for example, a web browser to access web server 232 to configure the call-blocking feature offered by mobile network 252.

Module 400 may perform certain operations, as described below. Module 400 may perform these operations in response to processing logic 420 executing software instructions (e.g., one or more applications 464) contained in a computer-readable medium, such as memory 460. A computer-readable medium may be defined as a physical or logical memory device. The software instructions may be read into memory 460 from another computer-readable medium or from another device via communication interface 450. The software instructions contained in memory 460 may cause processing logic 420 to perform processes that are described below.

Output device 440 may allow the user of module 400 to receive or view a menu of options. The menu may allow the user to select various functions or services associated with applications executed by module 400 or network 100. Input device 430 may allow the user to respond to the menu of options and/or activate a particular service or application. In the case of devices 202 and 204, for example, input device 430 and output device 440 may allow the user to reject incoming call requests, subscribe to a call-blocking feature offered in mobile network 252, or configure the call-blocking feature offered by mobile network 252. In the case of subscriber computer 236, input device 430 and output device 440 may allow, for example, the user to configure the call-blocking feature offered by mobile network 252.

Figure 5:
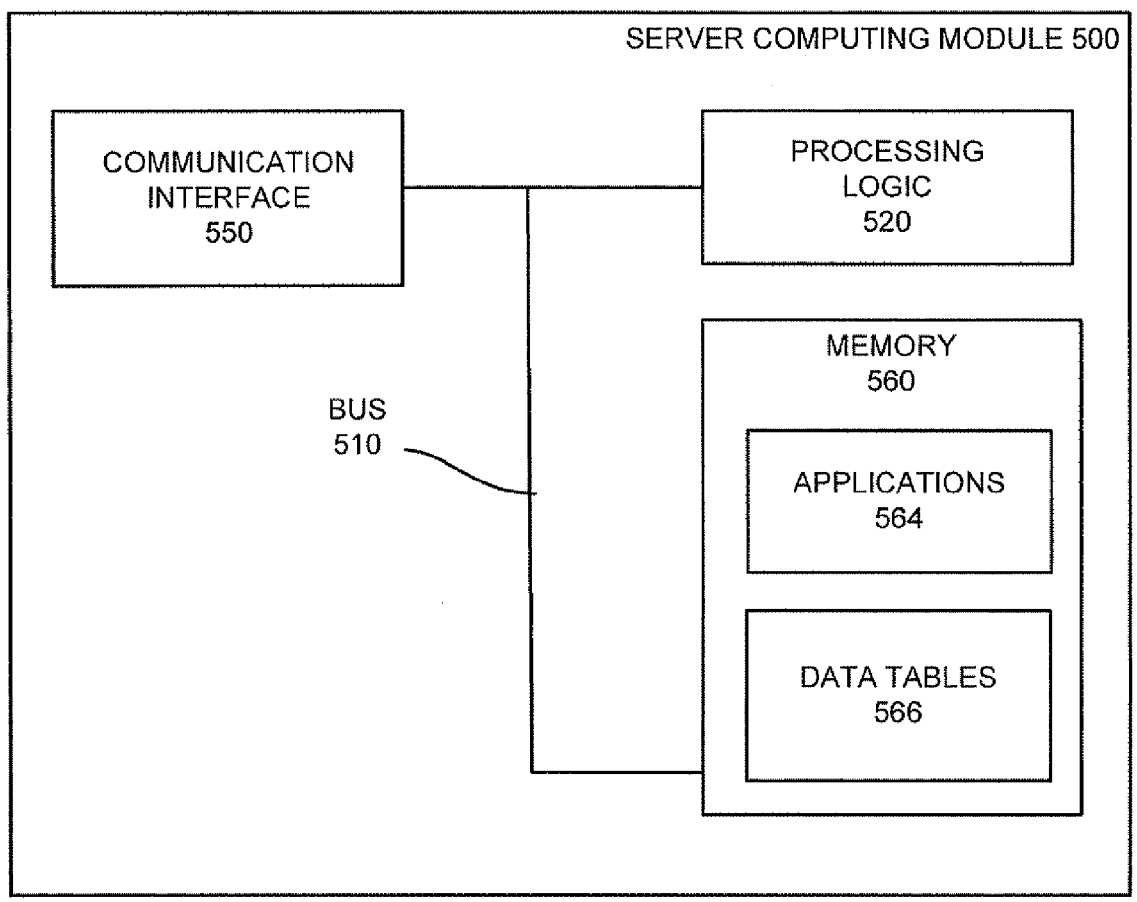
FIG. 5 is a block diagram of exemplary components of a server computing module.

FIG. 5 is a block diagram of exemplary components of a server computing module 500. BTS 206, BTS 208, BSC 210, MSC 212, GMSC 214, HLR 216, VLR 218, AUC 220, EIR 222, VM server 224, BLT 226, and web server 232 may include one or more (e.g., a rack of) server computing modules, such as module 500. Module 500 may include a bus 510, processing logic 520, a communication interface 550, and a memory 560. Memory 560 may include one or more applications 564 and data tables 566, which are described below. Module 500 may include other components (not shown) that aid in receiving, transmitting, and/or processing data. Moreover, other configurations of components in module 500 are possible.

Bus 510 may include a path that permits communication among the components of module 500. Processing logic 520 may include any type of processor or microprocessor (or groups of processors or microprocessors) that interprets and executes instructions. In other embodiments, processing logic 520 may include an ASIC, an FPGA, or the like.

Communication interface 550 may include any transceiver-like mechanism that enables module 500 to communicate with other devices and/or systems. Communication interface 550 may include a transmitter that may convert baseband signals from processing logic 520 to radio frequency (RF) signals and/or a receiver that may convert RF signals to baseband signals. Alternatively, communication interface 550 may include a transceiver to perform functions of both a transmitter and a receiver. Communication interface 550 may be coupled to an antenna for transmission and reception of the RF signals. Communications interface 550 may include a network interface card, e.g., Ethernet card, for wired communications or a WiFi card for wireless communications.

Memory 560 may include a RAM or another type of dynamic or static storage device that may store information and instructions, e.g., an application, for execution by processing logic 520; a ROM device or another type of static storage device that may store static information and instructions for use by processing logic 520; and/or some other type of magnetic or optical recording medium and its corresponding drive, e.g., a HDD, for storing information and/or instructions. As mentioned above, memory 560 may include one or more applications 564 and data tables 566, which are described below.

In the case of BLT 226, data tables 566 may include, for example, a table of rules for identifying and automatically denying call requests. Further, applications 564 may include, for example, an application for BLT 226 to query rule tables to determine whether an incoming call request should be denied or not.

In the case of HLR 216, data tables 566 may include a table of device IDs that are associated with a subscription to a call-blocking feature of mobile network 252. Further, applications 564 may include for example, an application for HLR 216 to interface with BLT 226 to determine whether an incoming call request should be denied or not. In the case of MSC 212, applications 564 may include, for example, an application to interface with HLR 216 to determine whether a device ID is associated with a subscription to a call-blocking feature and whether an incoming call request should be automatically denied.

Module 500 may perform certain operations, as described below. Module 500 may perform these operations in response to processing logic 520 executing software instructions (e.g., one or more applications 564) stored in a computer-readable medium, such as memory 560. The software instructions may be read into memory 560 from another computer-readable medium or from another device via communication interface 550. The software instructions contained in memory 560 may cause processing logic 520 to perform processes that are described below.

FIG. 6 is a block diagram of an exemplary subscription table 600-1 and an exemplary subscription table 600-2 (collectively "subscription table 600") that may be used in embodiments described herein. Subscription table 600 may identify devices, such as device 202, that may be associated with a subscription to a call-blocking feature provided by a mobile network, such as mobile network 252. Subscription table 600-1 and subscription table 600-2 may indicate the state of subscription table 600 at two different times, for example. Subscription table 600 may be stored in memory 560 (e.g., as one of data tables 566) of HLR 216. In another embodiment, subscription table 600 may also (or alternatively) be stored in any components of network 100 or network 252, such as VLR 218, MSC 212, VM server 224, AUC 220, BLT 226, EIR 222, etc.

Subscription table 600 may include a device ID field 602 and a subscription flag field 604. Subscription table 600 may include additional, different, or fewer fields than illustrated in FIG. 6.

Device ID field 602 may include the device ID (e.g., phone number, device number, account number, subscriber number, etc.) associated with a communication device, such as device 202. Subscription flag field 604 may indicate whether the corresponding device ID in device ID field 602 is associated with a subscription to a call-blocking feature. For example, a TRUE in flag field 604 may indicate that the corresponding device ID may be associated with a subscription to the call-blocking feature. On the other hand, a FALSE in flag field 604 may indicate that the corresponding device ID may not be associated with a subscription to the call-blocking feature. If a device ID lacks a record in subscription table 600, this lack of a record may also indicate that the device ID is not associated with a subscription to the call-blocking feature.

Exemplary subscription table 600-1 includes one entry, e.g., a record 652. Record 652 includes a device ID of 555-5656 in device ID field 602 and a TRUE flag in subscription flag field 604. Record 652 indicates that the device ID of 555-5656 is associated with a subscription to a call-blocking feature. The device ID of 555-3434 lacks a record in subscription table 600-1, meaning that device ID of 555-3434 is not associated with a subscription to the call-blocking feature.

Exemplary subscription table 600-2, which may indicate the state of subscription table 600 at a different time than subscription table 600-1, includes two entries, e.g., records 652 and 654. Record 652 is described above. Record 654 includes a device ID of 555-4545 in device ID field 602. Record 654 also indicates a TRUE flag in subscription flag field 604, meaning that the device ID of 555-4545 is associated with a subscription to the call-blocking feature. If record 654 included a FALSE flag in subscription flag field 604, for example, this would indicate that the device ID of 555-4545 was not associated with a subscription to the call-blocking feature.

FIG. 7 is a block diagram of an exemplary rule table 700-1 and an exemplary rule table 700-2 (collectively "rule table 700") that may be used in one or more embodiments described herein. Rule table 700 may identify actions that may be implemented when a request for a call is received in network 100. Rule table 700-1 and rule table 700-2 may indicate the state of rule table 700 at two different times, for example. Rule table 700 may be stored in memory 560 (e.g., as one of data tables 566) of BLT 226, for example. Rule table 700, or portions of rule table 700, may also (or alternatively) be stored in other components of network 100 or network 252, such as of HLR 216, VLR 218, MSC 212, VM server 224, AUC 220, EIR 222, device 202, etc.

Rule table 700 may include a called device ID field 702, a caller device ID field 704, a called device location field 706, and an action field 708. Fields 702 through 706 specify conditions that, if met, may trigger the action specified in action field 708 when an incoming call request is received.

Called device ID field 702 may indicate the device ID to which the call request may be directed. Caller device ID field 704 may indicate the device ID from which the call request was sent. Called device location field 706 may indicate a location (e.g., HOME, WORK, or CAR) of the device associated with the corresponding called device ID in field 704.

Action field 708 may indicate the action that may be taken when the conditions specified in field 702-706 are met when an incoming call request is received. Action field 708 may specify REJECT, for example, which may indicate that a call request may be rejected (e.g., blocked or denied) when the call request meets the conditions of the corresponding rule. Actions other than REJECT are possible. For example, action field 708 may specify DO NOT REJECT, which may indicate that a call request may not be denied when the call request meets the conditions of the corresponding rule. As another example, action field 708 may specify FORWARD, which may indicate that a call request should be forwarded to a different device ID when the call request meets the conditions in the corresponding rule.

As shown in rule 750 of exemplary rule table 700-1, when an incoming call request includes a called device ID of 555-5656 and a caller device ID of 555-1212, and when the device associated with the called device ID is at WORK, then the call request may be rejected, as indicated in action field 708. As shown in rule 752, when a call request includes a called device ID of 555-5656 and a caller device ID of 555-9898, the call request may be rejected, as indicated in action field 708. Rule 752 does not specify the location of the called device (e.g., field 706 indicates ANY).

Rule table 700-2 includes rules 750 and 752, described above, and a rule 754 as well as. As shown in rule 754 of rule table 700-2, when a call request includes a called device ID of 555-4545 and a caller device ID of 555-3434, the call request may be rejected, as indicated in action field 708. Like rule 752, rule 754 does not specify the location of the called device.

Rules in rule table 700 may be configured by the user of a device, such as device 202, for example. The user may configure rule table 700 using device 202 or using subscriber computer 236 (e.g., through a web interface). Rules may also be set by a network administrator, for example.

Additional, different, or fewer fields other than those shown in FIG. 7 are possible. For example, rule table 700 may include a caller device location field that may specify a condition related to the location of the caller device when an incoming call request is received. In addition, rule table 700 may include a time field that may specify a condition related to the time of an incoming call request when an incoming call request is received.

As discussed above, a communication device, such as device 202, may include a call-blocking application (e.g., an application to configure and/or subscribe to a call-blocking feature offered by mobile network 252). In one embodiment, the call-blocking application may be downloaded to a communication device, such as device 202. For example, a user could run the browser application in device 202 to reach web server 232 and mobile network 252 for downloading and installing the call-blocking application.

Downloading and installing the call-blocking application may, in one embodiment, automatically associate the communication device, such as device 202, to a subscription to the call-blocking feature. In this embodiment, subscription table 600 may be updated to include a new record when the application is downloaded to the communication device. For example, if the call-blocking application is downloaded and installed on device 202 (with a device ID of 555-4545), then subscription table 600 may be updated to include record 654 as shown in table 600-2.

In another embodiment, the communication device may be associated with a subscription to the call-blocking feature when the call-blocking application is first used in the communication device. For example, if the call-blocking application is downloaded and installed on device 202 (with a device ID of 555-4545), then, when the user first uses the application, subscription table 600 may be updated to include record 654.

Figure 8A:
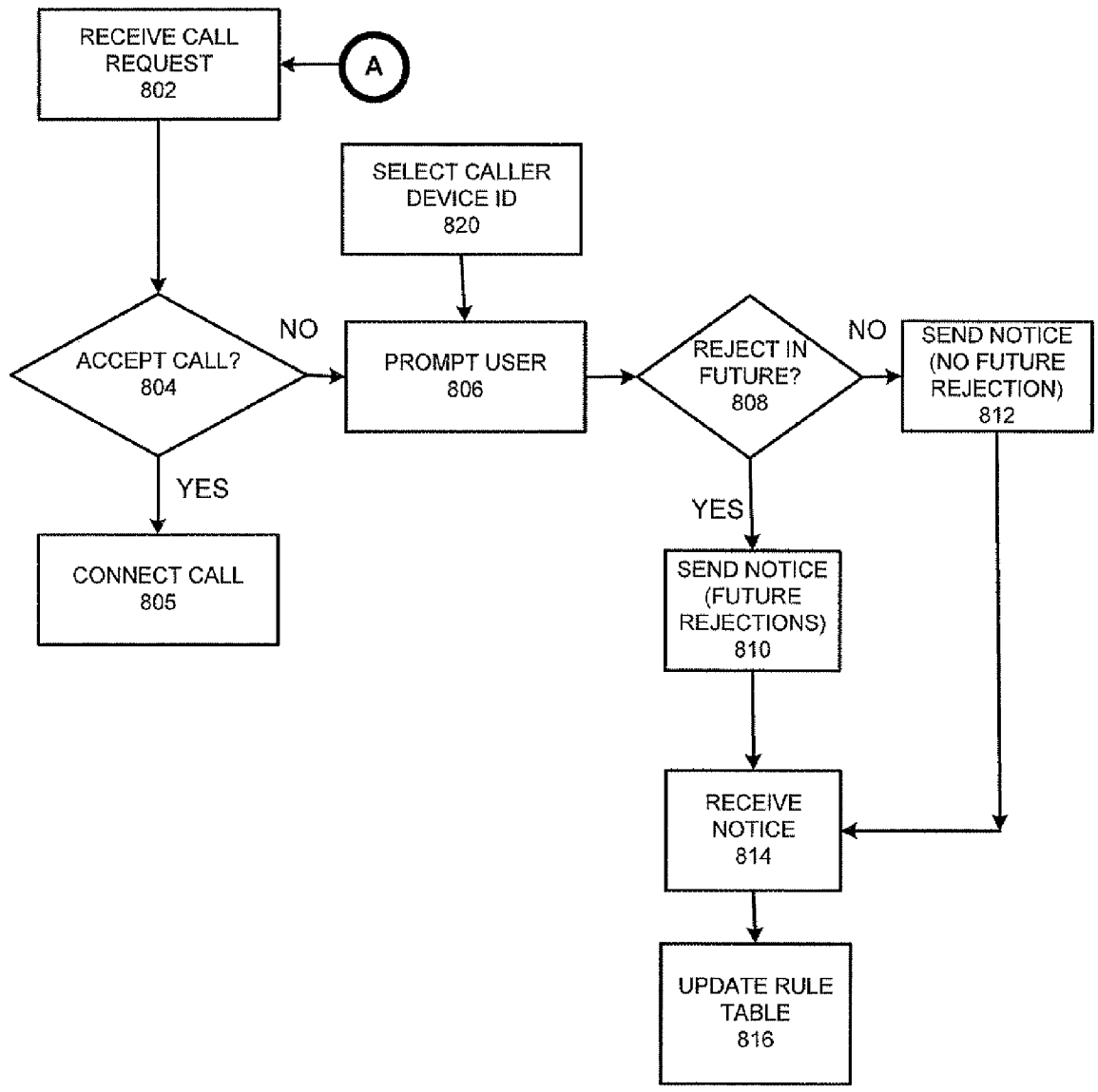
FIGS. 8A and 8B show a flowchart of an exemplary process for processing a call request in one or more embodiments described herein.
Figure 8B:
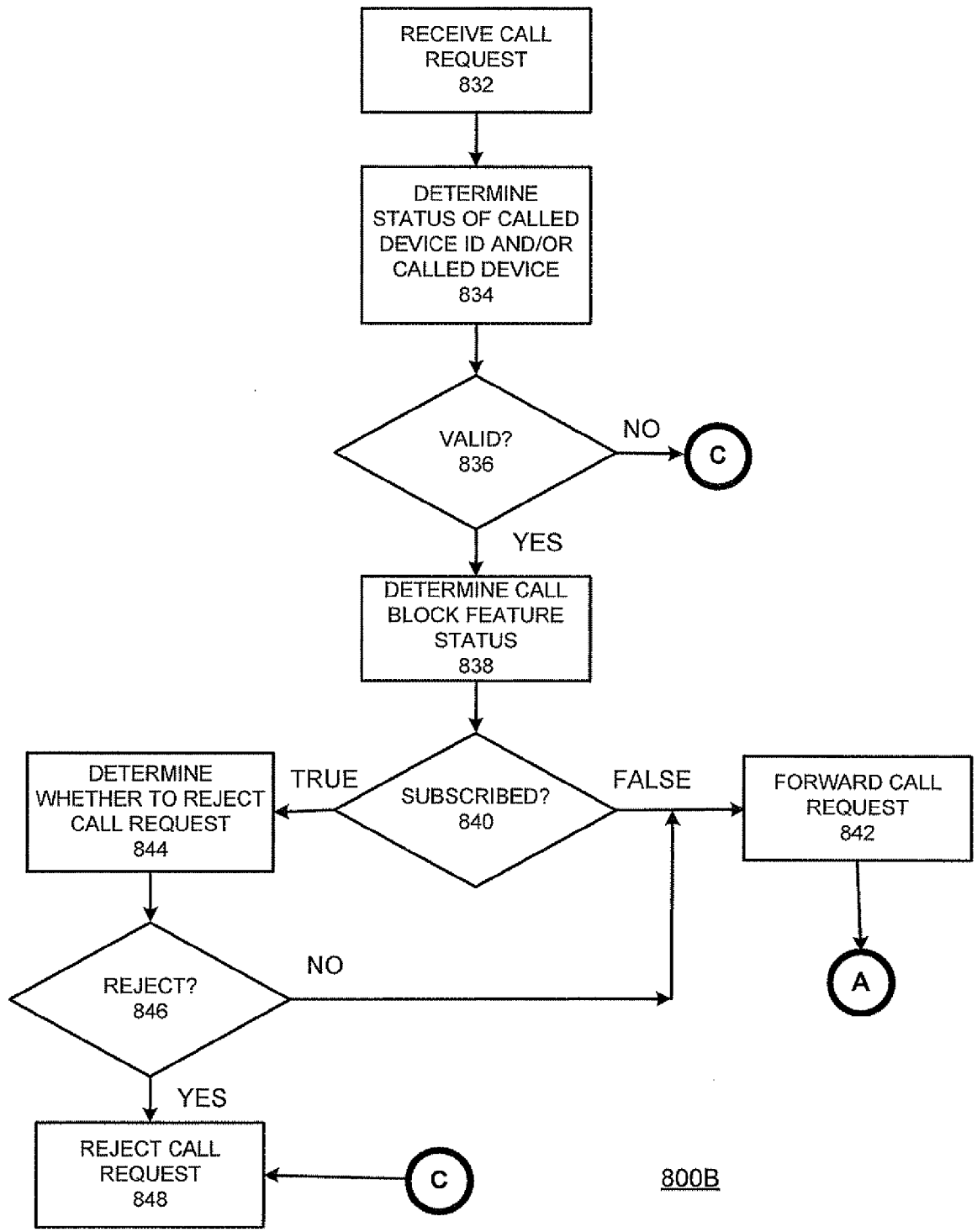

FIGS. 8A and 8B show a flowchart of an exemplary process 800 for processing call requests in one or more embodiments described herein. More specifically, FIG. 8A is a flow chart of an exemplary process 800A for a user of a called device to establish call-blocking rules. FIG. 8B is a flow chart of an exemplary process 800B for determining whether a call request should be automatically blocked. FIGS. 8A and 8B are described with respect to FIGS. 9A and 9B, which are diagrams of exemplary signals that may pass between components 202-236 in one or more embodiments described herein. For convenience, HLR 216 and VLR 218 are shown as a single device in FIGS. 9A and 9B. In another embodiment, HLR 216 and VLR 218 may be separate devices.

Figure 9A:
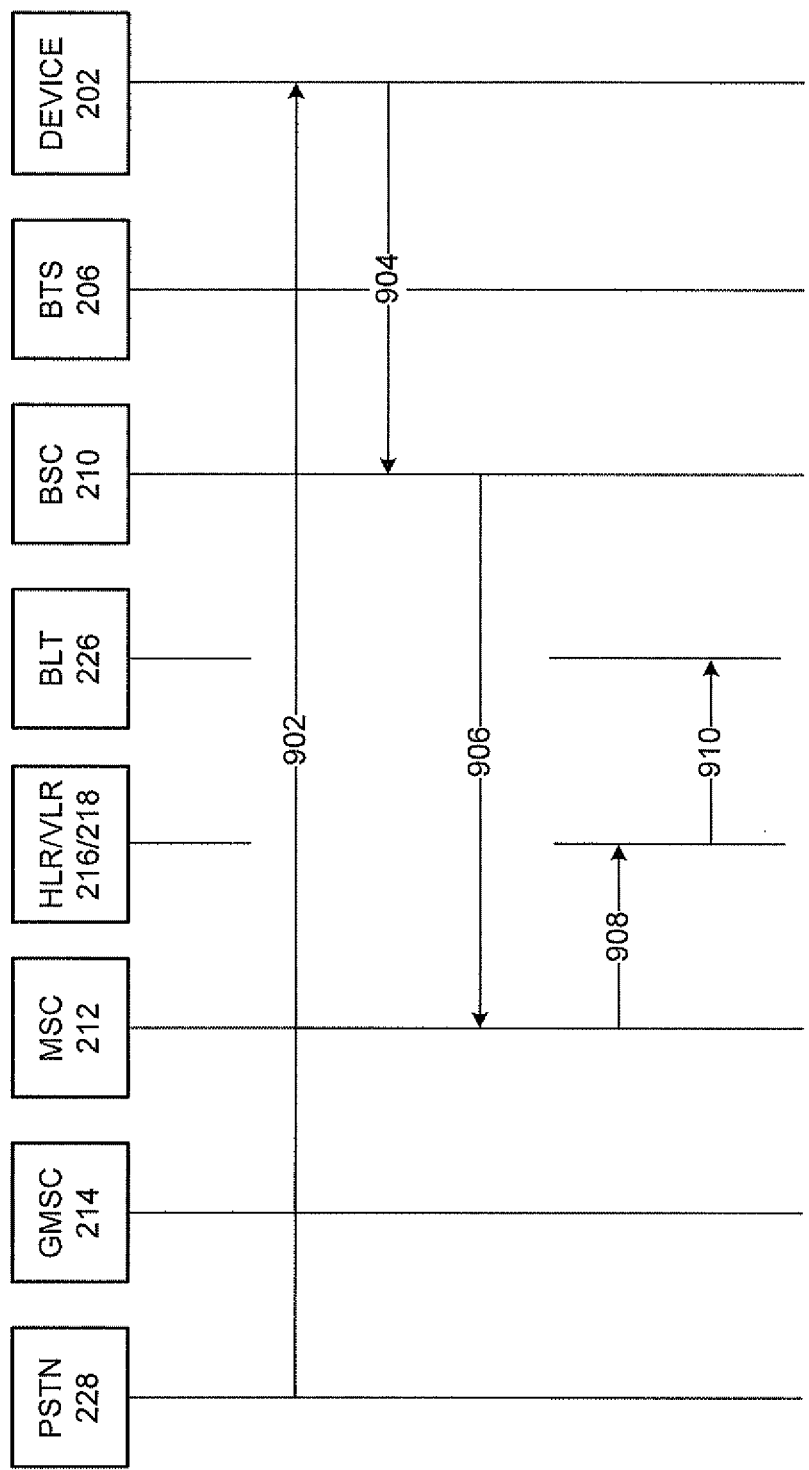
FIGS. 9A and 9B are diagrams of exemplary signals that may pass between components in one or more embodiments described herein.

A call request may be received (block 802). For example, as shown in FIG. 9A, device 202 may receive a call request signal 902 that originated from phone 230 (coupled to PSTN 228). Request signal 902 may include, for example, the caller device ID and the called device ID. The user of device 202 may have the option of accepting or rejecting the call request. If the call request is accepted (block 804: YES), the call may be connected (block 805). If the call request is rejected, e.g., denied or not accepted (block 804: NO), process 800A may proceed to block 806. A user of a device, such as device 202, may reject a call request, for example, by not answering the call or by pressing a key on the device.

The user may be prompted regarding whether to reject call requests in the future from the caller device ID (block 806). If calls from the caller device ID are to be rejected in the future (block 808: YES), then process 800A may proceed to block 810. A notice indicating automatic rejection of future call requests from the caller device ID may be sent (block 810). In this case, device 202 may send a notice signal 904 (indicating automatic rejection of future call requests) to BSC 210. If calls from the caller device ID are not to be rejected in the future (block 808: NO), then process 800A may proceed to block 812. A notice indicating that future call requests may not be automatically rejected may be sent (block 812). In this case, device 202 may send notice signal 904 (indicating no automatic rejection of future call requests) to BSC 210. In another embodiment, if calls from the caller device ID are not to be rejected in the future (block 808: NO), then process 800A may end.

Figures 10A, 10B:
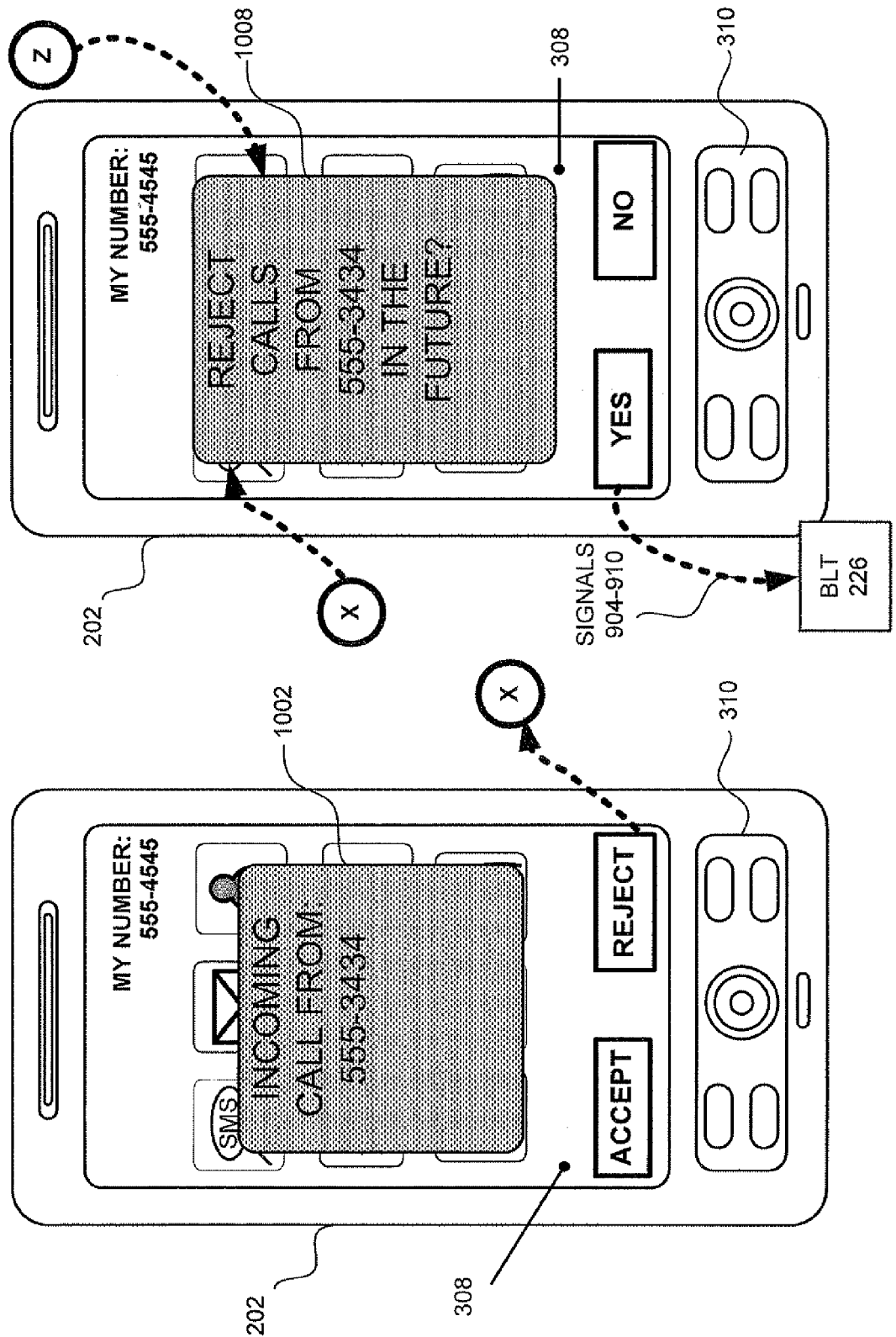

Blocks 802 through 812 are further described in the following example in conjunction with FIGS. 10A and 10B, which are diagrams of exemplary user interfaces for device 202. Device 202 (with a device ID of 555-4545) may receive call request signal 902 (from device ID 555-3434). As shown in FIG. 10A, device 202 may indicate an incoming call request from phone 230 with a dialog box 1002 on display 308. The user of device 202 may accept the incoming call request (block 804: YES) from caller device ID 555-3434 by, for example, pressing an ACCEPT button on display 308 or using control keys 310. Alternatively, the user of device 202 may reject the incoming call request (block 804: NO) from caller device ID 555-3434 by, for example, pressing a REJECT button on display 308 or using control keys 310. The user of device 202 may also reject the incoming call request (block 804: NO) from caller device ID 555-3434 by not pressing any buttons or taking any action, for example.

If the incoming call request is rejected (block 804: NO), the user may be prompted with a dialog box 1008 regarding whether to reject call requests from the caller device ID, e.g., 555-5656, in the future (block 806). The user of device 202 may reject call requests from caller device ID of 555-3434 in the future by, for example, pressing a YES button on display 308 or by using control keys 310 (block 808: YES). By selecting YES (block 808: YES), device 202 may send a notice signal 904 to BSC 210 indicating that future call requests from 555-3434 (the caller device ID) should be rejected. In one embodiment, notice signal 904 may include a request for a new subscription to a call-blocking feature if the called device ID of 555-4545 is not associated with a subscription to the call-blocking feature.

If the user of device 202 does not wish to block future call requests from caller device ID of 555-3434, then the user of device 202 may press a NO button on display 308 or use control keys 310. In this case, notice signal 904 sent to BSC 210 may indicate that future call requests should not be automatically blocked. In another embodiment, if the user of device 202 does not wish to block future call requests from caller device ID of 555-3434, then notice signal 904 may not be sent and process 800A may end.

Returning to FIG. 8A, the notice may be received (block 814). BSC 210 may receive notice signal 904 and may pass a notice signal 906 to MSC 212. MSC 212 may forward signal 906 as a notice signal 908 to HLR 216 and/or VLR 218. HLR 216 and/or VLR 218 may send a notice signal 910 to BLT 226. The rule table may be updated (block 816). BLT 226 may update rule table 700 to indicate that call requests from the caller device ID should be rejected automatically in the future.

As shown in the example in FIG. 10B, if the user of device 202 presses the YES button on display 308, then signals 904-910 may indicate that called device 202 (caller device ID of 555-4545) wishes to automatically block future call requests from device ID 555-3434. In this case, BLT 226 may add rule 754 indicating that future calls to device ID of 555-4545 from caller device ID of 555-3434 should be rejected. If signal 904 included an instruction to add a new subscription to the call-blocking feature, HLR 216 may update subscription table 600 to indicate that the called device ID should be associated with a call-blocking feature. For example, HLR 216 may add record 654 to subscription table 600 so that it appears as shown in subscription table 600-2 (indicating that the device ID of 555-4545 is associated with a subscription to a call-blocking feature).

On the other hand, if the user of device 202 presses the NO button on display 308 in FIG. 10, signals 904-910 may indicate that device 202 (caller ID of 555-4545) does not wish to block future calls from device ID 555-3434. In this case, BLT 226 may determine not to update rule table 700. In another embodiment, BLT 226 may associate the called device ID of 555-4545 and the caller device ID of 555-3434 with the action of DO NOT BLOCK. In yet another embodiment, signals 904-910 may not be sent and, instead, process 800A may end.

A user may be prompted to reject future call requests (block 806) at times other than just after rejecting a call (block 804: NO). For example, a caller device ID may be selected (block 820) and the user may be prompted regarding whether to reject calls from the selected caller device ID in the future (block 806). Process 800A may then proceed to block 808 as described above.

Blocks 820 and 806 are described in the following example. As shown in FIG. 10C, a user may use control keys 310 to select an icon 1020 to display a list of caller device IDs. Alternatively, the user may touch icon 1002 on display 308. As shown in FIG. 10D, the user may be presented with a list of caller device IDs. The user may select one of the caller device IDs, such as 555-3434, by using control keys 310 or touching display 308, for example. As shown in FIG. 10B, described above, the user may be prompted regarding whether to reject calls from the selected caller device ID in the future.

Figure 9B:
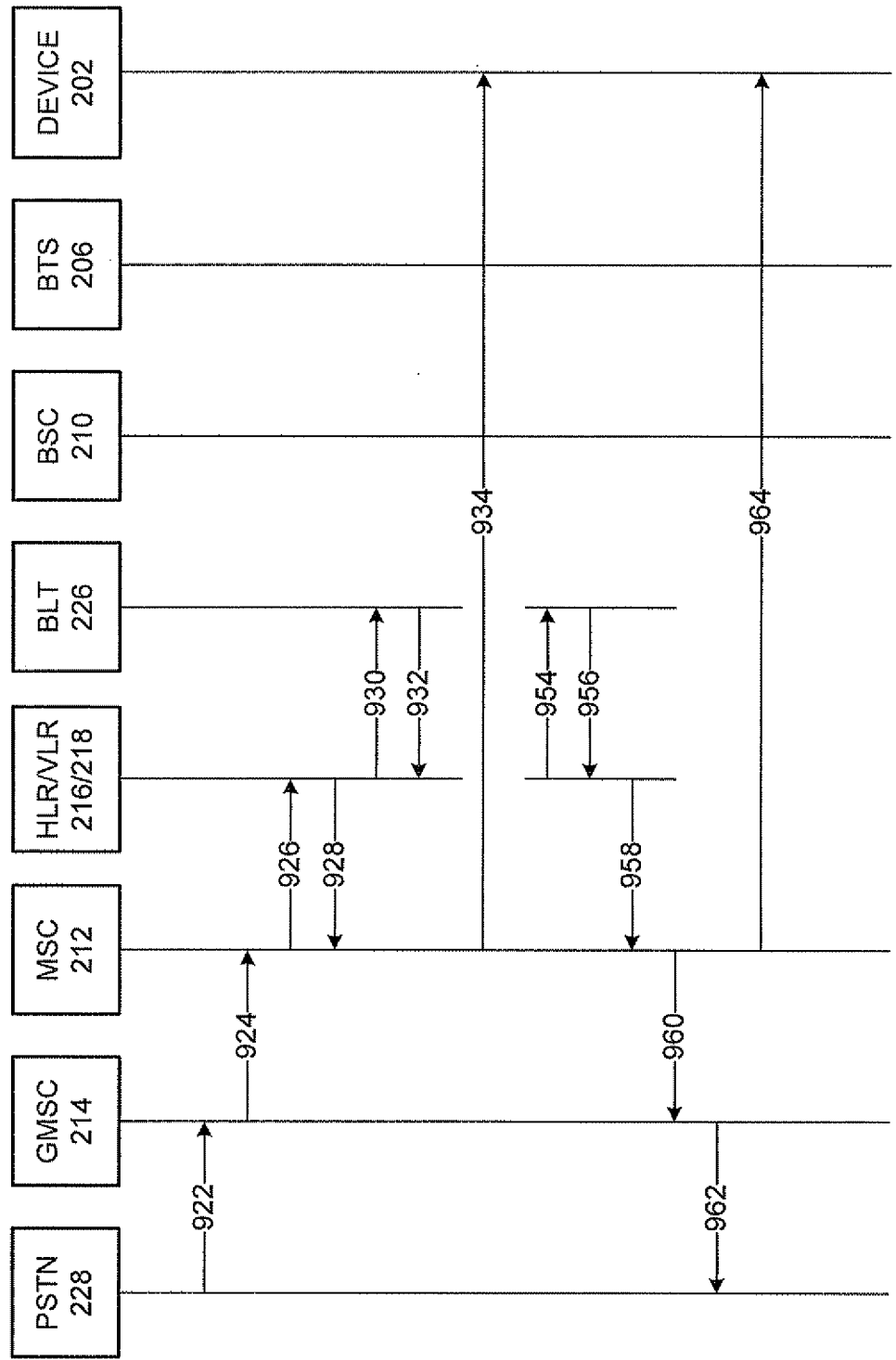

As indicated above, FIG. 8B is a flow chart of an exemplary process 800B for determining whether a call request should be automatically blocked. A request for a call may be received (block 832). For example, a call request may originate from phone 230 to request a call with device 202. As shown in FIG. 9B, GMSC 214 may receive a call request signal 922 from PSTN 228 (coupled to phone 230) to request a call to device 202. Request signal 922 may include the caller device ID and the called device ID. As shown in FIG. 9B, GMSC 214 may forward request signal 922 as a request signal 924 to MSC 212.

The validity and/or status of the called device ID may be determined (block 834). As shown in FIG. 9B, MSC 212 may send a query signal 926 to VLR 218 and/or HLR 216 to determine the validity and/or status of the called device ID. Query signal 926 may include the called device ID. Determining the status and/or validity may include determining whether the called device ID is associated with a current service account with mobile network 252 or whether the called device is turned on or off. In one embodiment, determining the status may also include determining the current called device location. As described above, VLR 218 may store the current location of the called device, for example, based on information received from a GPS unit in the called device. As shown in FIG. 9B, validity and/or status information may be sent from HLR 216 and/or VLR 218 to MSC 212 in a signal 928.

If the status of the device associated with the called device ID is valid (block 836: YES), then a call-blocking feature subscription status may be determined (block 838). For example, if the called device is on, is located, etc., then BLT 226 may be queried to determine the subscription status of the call-blocking feature. As shown in FIG. 9B, HLR 216 may send a query signal 930 to BLT 226 to determine whether the called device ID is associated with a subscription to the call-blocking feature. Query signal 930 may include, for example, the called device ID. BLT 226 may search subscription table 600 and may determine whether the called device ID is associated with a subscription to the call-blocking feature. As shown in FIG. 9B, BLT 226 may send a response signal 932 indicating whether the called device ID is associated with a subscription to the call-blocking feature.

If the called device ID is not associated with a subscription to the call-blocking feature (block 840: FALSE), then the request for a call may be forwarded (block 842). In this case, MSC 212 may forward call request signal 924 to the called device (passing through BSC 210 and BTS 206) as a call request signal 934. Device 202 may receive call request signal 934, as described above with respect to block 802 in FIG. 8A. Process 800A may, as described above, allow the user of the called device to accept or reject the incoming call request.

Blocks 832-842 are further described in the following example. A call request may originate from phone 230 (device ID of 555-3434) to request a call with device 202 (device ID of 555-4545) while device 202 is turned on and is associated with a valid service contract with mobile network 252. In this example, request signal 922 may include the caller device ID of 555-3434 and the called device ID of 555-4545. GMSC 214 may forward the caller device ID of 555-3434 and the called device ID of 555-4545 in request signal 924 to MSC 212. Because the called device, e.g., device 202, is turned on and includes a current service contract with mobile network 252, query response signal 928 sent to MSC 212 may indicate, among other things, the valid status and/or validity of the called device 202. Device 202 (e.g., device ID 555-4545), however, may not be associated with a subscription to a call-blocking feature and, thus, subscription table 600 may be in the state shown in subscription table 600-1. Response signal 932 may indicate, therefore, that called device 202 is not associated with a call-blocking feature and, as a result, call request 922 may be forwarded to device 202 using signal 934. As described above with respect to process 800A, the user of device 202 may have the option of accepting or rejecting the call request.

Returning to FIG. 8B, if the called device ID is subscribed to the call-blocking feature (block 840: TRUE), then a determination of whether to deny the call request or not may be made (block 844). To make this determination, as shown in FIG. 9B, HLR 216 may send a query signal 954 to BLT 226. Query signal 954 may include the caller device ID, the called device ID, and the called device location. The called device location may have been determined, for example, at block 834, described above. BLT 226 may determine whether the call request should be blocked by searching rule table 700 based on, for example, the called device ID, the caller device ID, and the called device location.

If the determination is made that the call request should be blocked (block 846: YES), then the call request may be rejected (block 848). In this case, BLT 226 may send a response signal 956 to HLR 216 indicating that call request 922 should be rejected. HLR 216 may forward response signal 956 as a response signal 958 to MSC 212. MSC 212 may send a response signal 960 to GMSC 214 including a rejection of request signal 922. GMSC 214 may pass a response signal 962 to PSTN 228 (coupled to phone 230) including a rejection of request signal 922. In one embodiment, call request signal 922 may be forwarded to VM server 224 if, for example, the called device is associated with a voicemail service. In another embodiment, response signals 956-962 may include a message (e.g., an audible message) indicating that call request 922 was automatically blocked. In yet another embodiment, response signals 956-962 may include a busy signal.

Blocks 838 through 848 are described in the following example. In this example, a call request may originate from phone 230 (device ID of 555-3434) to request a call with device 202 (device ID of 555-4545). In this example, subscription table 600 may appear as it does in subscription table 600-2 (e.g., with record 654). In addition, rule table 700 may appear as it does in rule table 700-2. In other words, the user of device 202 may have subscribed to the call-blocking feature and added rule 754, as directed to rejecting calls from caller device ID of 555-3434 (e.g., phone 230).

Because device 202 is associated with a subscription to a call-blocking feature, response signal 932 may indicate that called device 202 is associated with a call-blocking feature (block 840: TRUE) and, as a result, a determination of whether to deny the call request or not may be made (block 844). To make this determination, as shown in FIG. 9B, HLR 216 may send a query signal 954 to BLT 226. Query signal 954 may include the caller device ID (e.g., 555-3434), the called device ID (e.g., 555-4545), and the called device location. The called device location may be determined, for example, at block 834.

In this example, rule table 700-2 indicates that a call from caller device ID 555-3434 to called device ID 555-4545 should be rejected (e.g., rule 754) no matter the location of the called device. Thus, the call request received from device ID of 555-3434 to device ID of 555-4545 should be rejected according to rule 754. If rule 754 includes a location in called device location field 706, then BLT 226 may compare the current location of the called device received in query signal 954 with the location stored in called device location field 706. BLT 226 may send a response signal 956 to HLR 216 indicating that the call request should be rejected. Response signal 956-962 may all indicate a rejection of the call request. Response signals 956-962 may include a busy signal or a message (e.g., an audible message) indicating that call request 922 was automatically blocked. In one embodiment, call request 922 may be redirected to VM server 224, if the called device ID is associated with such a service.

Returning to FIG. 8B, if the determination is made that the call request should not be blocked (block 846: NO), then the call request may be forwarded (block 842). In this case, BLT 226 may send a response signal 956 to HLR 216 and HLR 216 may send response signal 958 to MSC 212 indicating that call request signal 922 should not be rejected. In this case, MSC 212 may forward call request signal 964 to device 202 (passing through BSC 210 and BTS 206). Process 800 may proceed to block 802, described above, where the user of the called device may accept or reject the incoming call request.

If the status of the device associated with the called device ID is not valid (block 836: NO), the call request may be rejected (block 848), as described above. For example, if the called device is not associated with a service with mobile network 252 then request signal 922 may be denied in signals 950-962.

Various modifications to process 800 are possible. For example, when the user is prompted at block 806 regarding sending a notice to BLT 226 regarding future rejections of call requests, the user may be prompted with respect to other fields in rule table 700. The user may be prompted, for example, regarding the called location field 706. The user may specify information related to called location field 706 for BLT to add to rule table 700 at block 816.

In one embodiment, a decision may be made regarding whether to prompt the user at block 806 or not. The decision regarding whether to prompt the user may be made according to an algorithm. This algorithm may include, for example, whether the called device has previously received call requests from the caller device ID, whether previous call requests from the caller device ID have been rejected, the length of previous call connections between the caller device ID and the called device ID, whether the caller device ID is stored in a contacts list in called device, etc. For example, block 806 (prompting the user) may be skipped after the user rejects a call request (block 804: NO) when the caller device ID has previously engaged in very long call connections with the called device ID. On the other hand, block 806 (prompting the user) may be implemented when the caller device ID has been rejected previously on a number of occasions. In one embodiment, the algorithm determining whether or not to prompt the user may run in mobile network 252 (e.g., BLT 226) and mobile network 252 may send a signal to the communication device (e.g., device 202) to prompt the user. In another embodiment, the algorithm my run in the communication device (e.g., device 202).

Figure 11:
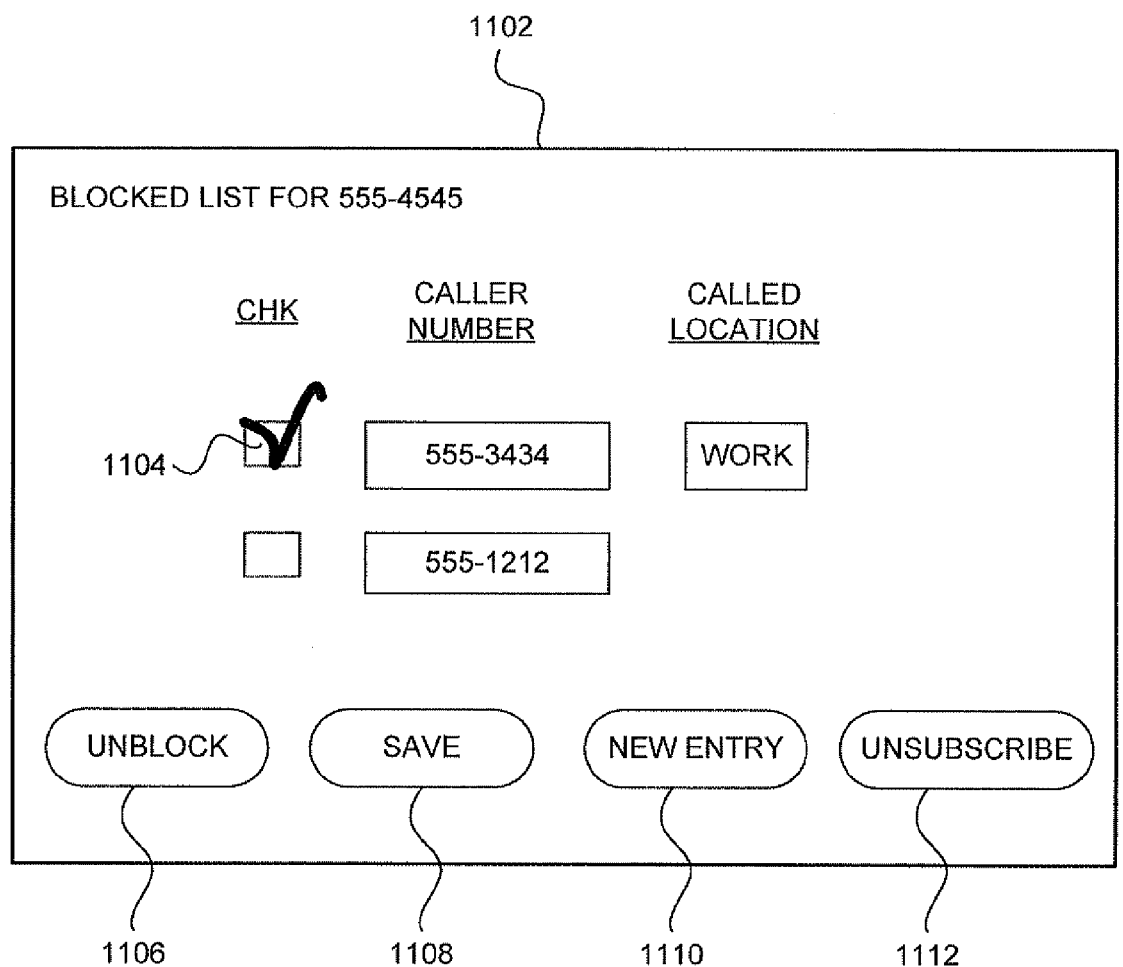
FIG. 11 is a diagram of an exemplary user interface for a subscriber computer in one or more embodiments described herein.

FIG. 11 is a diagram of an exemplary user interface 1102 for editing a rule table. A display screen may display user interface 1102 to show the information stored in rule table 700, for example. A user may use subscriber computer 236, for example, to access BLT 226 through network 234 and web server 232 to change, edit, or update rule table 700 and/or subscription table 600, for example. In one embodiment, a user may use a communication device, such as device 202, to access BLT 226 through mobile network 252 to change, edit, or update rule table 700 and/or subscription table 600, for example. User interface 1102 may include a number of elements, including a check 1104, an unblock button 1106, a save button 1108, a new entry button 1110, and an unsubscribe button 1112. Other buttons may be possible, and other configurations of buttons and elements on user interface 1102 are possible.

The user may edit information shown in user interface 1102 and may press save button 1108 to save the updated information. The user may enter check 1104, for example, and may press unblock button 1106 to remove a rule from rule table 700-2. A user may add a new rule, for example, by clicking on new entry button 1110. A user may unsubscribe from the call-blocking feature, for example, by pressing an unsubscribe button 1112. If the user has not yet subscribed to a call-blocking feature, the user may also use subscriber computer 236 to interface with mobile network 252 subscribe to the call-blocking feature of mobile network 252.

The above embodiments describe a call-blocking feature operating in a "blacklist" mode. In a blacklist embodiment, call requests may not be automatically denied unless there is a rule indicating so. In other embodiments, the call-blocking feature may operate in a "whitelist" mode. In whitelist embodiments, call requests may be denied automatically unless there is a rule indicating that it should not be denied. A whitelist rule may include an action such as DO NOT BLOCK in action field 708 of rule table 700.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above, such as with respect to FIGS. 8A and 8B, the order of the blocks may differ in other implementations. Moreover, non-dependent blocks may be implemented in parallel.

It will be apparent that aspects of the embodiments, as described above, may be implemented in many different forms of software, firmware, and hardware in the implementations illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, from a network, a call request in a communication device, the call request including an identification of a calling party;
    notifying a user of the communication device of the call request;
    receiving, from the user and in response to the notification, an indication to deny the call request;
    denying the call request in response to receiving the indication to deny the call request from the user;
    displaying a prompt to the user of the communication device, in response to receiving from the user the indication to deny the call request, regarding automatically denying future call requests having the identification of the calling party;
    receiving an indication from the user, in response to displaying the prompt, to deny the future call requests having the identification of the calling party; and
    sending an instruction from the communication device to the network instructing the network to automatically deny the future call requests having the identification of the calling party,
    wherein displaying the prompt to the user of the communication device, in response to receiving the indication to deny the call request from the user, regarding automatically denying future call requests having the identification of the calling party includes:
        determining to display the prompt to the user, in response to receiving the indication to deny the call request, regarding automatically denying future call requests having the identification of the calling party, the determination based on a comparison of the calling party identification with a list of previous calling party identifications, a number of call requests previously received from the calling party identifier, and a length of one or more previous calls between the calling party and the communications device.

2. The method of claim 1,
    where sending the instruction to the network to automatically deny the future call requests includes wirelessly sending the instruction to a base transceiver station; and
    where receiving the call request includes wirelessly receiving the call request from the base transceiver station.

3. The method of claim 1,
    wherein determining to display the prompt to the user, in response to receiving the indication to deny the call request, regarding automatically denying future call requests having the identification of the calling party, includes determining based on:
        a comparison of the calling party identification with a list of contacts stored in the communications device.

4. A method comprising:
    receiving a request for a call in a network device, the request including an identification of a calling party and an identification of a called party, where the identification of the called party is associated with a mobile communications device separate from the network device;
    querying a subscription database to determine whether the identification of the called party is associated with a subscription to an automatic call-blocking feature;
    querying a rule database, when the identification of the called party is associated with the subscription to the automatic call-blocking feature, to determine whether the identification of the calling party is associated with a rule to automatically deny the request for the call to the called party;
    denying the request for the call based on the rule, at the network device, when the identification of the calling party is associated with the rule to automatically deny the request for the call;

forwarding the request to the mobile communication device when the identification of the calling party is not associated with the rule to automatically deny the request for the call;

receiving an indication from the mobile communication device, in response to the request having been forwarded to the mobile communication device, to deny the request for the call, wherein the call is not established between the calling party and the called party;

sending a signal to the mobile communication device, in response to receiving the indication from the mobile communication device to deny the request for the call and when the identification of the calling party is not associated with the rule to automatically deny the request for the call, instructing the mobile communication device to display a prompt to a user of the mobile communication device regarding automatically denying future call requests having the identification of the calling party; and determining a current location of the mobile communication device, where the rule to automatically deny the request for the call to the called party is based on the current location of the mobile communication device associated with the identification of the called party.

5. The method of claim 4, wherein instructing the mobile communication device to display the prompt to the user of the communication device regarding automatically denying future call requests having the identification of the calling party includes:

determining to instruct the mobile communication device to display the prompt to the user regarding automatically denying future call requests having the identification of the calling party, the determination based on a comparison of the calling party identification with a list of previous calling party identifications, a number of call requests previously received from the calling party identifier, and a length of one or more previous calls between the calling party and the communications device.

6. The method of claim 5, wherein determining the current location of the mobile communication device includes one of querying a visitor location registry or wirelessly receiving information from the mobile communication device indicating the current location.

7. The method of claim 4, where the rule to automatically deny the request for the call to the called party includes a rule to automatically deny the request when the calling party identifier is not associated with a whitelist of calling party identifications.

8. The method of claim 4, further comprising:

wirelessly receiving an instruction in the network device from the mobile communication device to automatically deny future call requests having the identification of the calling party; and updating the rule database to reflect the instruction to automatically deny the future call requests having the identification of the calling party.

9. A system comprising:

a subscription database to store a plurality of communication device identifiers identifying mobile communication devices associated with subscriptions to an automatic call-blocking feature;

a rule database to store rules defining when call requests directed to the plurality of communication device identifiers should be automatically denied;

a receiver to receive a request for a call, the request for the call including an identification of a calling communication device and an identification of a called mobile communication device;

one or more processors, in a network device separate from the called mobile communication device, to:

query the subscription database to determine whether the identification of the called mobile communication device is associated with a subscription to the automatic call-blocking feature, query the rule database, when the identification of the called mobile communication device is associated with the subscription to the automatic call-blocking feature, to determine whether the identification of the calling communication device is associated with a rule to automatically deny the request for the call, and determine, when the identification of the calling communication device is associated with the rule to automatically deny the call request, that the request for the call should be denied based on the rule;

determine that the request for the call should not be denied when the identification of the calling communication device is not associated with a rule to deny the request for the call;

a receiver to receive an indication from the mobile communication device, in response to the request having been forwarded to the mobile communication device, to deny the request for the call, wherein the call is not established between the calling party and the called party; and a transmitter to transmit a signal to deny to the request for the call when the one or more processors determine the request for the call should be denied, and to transmit a signal to the mobile communication device instructing the mobile communication device to display a prompt to a user of the mobile communication device regarding automatically denying future call requests having the identification of the calling communication device in response to the receiver receiving the indication from the mobile communication device to deny the request for the call and when the one or more processors determine the request for the call should not be denied, wherein the one or more processors are configured to determine, in response to receiving the notification to deny the request for the call, to transmit the signal to the mobile communication device instructing the mobile communication device to display a prompt to the user of the communications device regarding automatically denying call requests having the identification of a calling party, the determination based on a comparison of the calling party identification with a list of previous calling party identifications, a number of call requests previously received from the calling party identifier, and a length of one or more previous calls between the calling party and the communications device.

10. The system of claim 9, where the one or more processors are further configured to:

determine a current location of the called mobile communication device; and determine that the request for the call should be denied based on the rule, where the rule is based on the current location of the called communication device.

11. The system of claim 10, where the receiver is configured to receive, from the called mobile communication device, information indicating the current location of the called mobile communication device; and where the one or more processors are configured to determine the current location of the called mobile communication device based on the received information.

12. The system of claim 9, further comprising:
where the receiver is configured to receive an instruction, from the called mobile communication device, to automatically deny call requests having the identification of the calling communication device; and
where the one or more processors are configured to update the rule database to reflect the instruction to automatically deny call requests having the identification of the calling communication device.

13. The system of claim 12,
where the one or more processors are further configured to determine the request for the call should not be denied when the identification of the calling communication device is associated with a rule not to deny the request for the call; and
where the transmitter transmits the request for the call to the mobile communication device when the one or more processors determine the request for the call should not be denied.

14. The system of claim 12,
where the one or more processors are further configured to determine, when the identification of the calling communication device is not associated with a rule to automatically deny the call request, that the request for the call should not be denied; and
where the transmitter transmits the request for the call to the mobile communication device when the one or more processors determine the request for the call should not be denied.

15. The system of claim 14,
where the receiver receives a notification, from the mobile communication device, of an indication to deny the request for the call; and
where the one or more processors are configured to determine, in response to receiving the notification to deny the request for the call, to transmit the signal to the mobile communication device instructing the mobile communication device to display a prompt to the user of the communications device regarding automatically denying call requests having the identification of a calling party, the determination based on a comparison of the calling party identification with a list of contacts stored in the communications device.

16. The system of claim 15, where the one or more processors are configured to determine the request for the call should not be denied when the identification of the calling communication device is associated with a whitelist of calling communication device identifications.

17. A portable communication device comprising:
a receiver to receive, from a network, a call request including an identification of a calling party;
a display to notify a user of the portable communication device with a notification of the call request;
a user interface for receiving, from the user, an indication to deny the call request,
wherein the call request is denied in response to receiving from the user the indication to deny the call request,
wherein the user interface displays a prompt to the user on the display, in response to receiving from the user the indication to deny the call request, regarding automatically denying future call requests having the identification of the calling party, and
wherein the user interface is further configured to receive an indication from the user, in response to the user interface displaying the prompt to the user, to deny the future call requests having the identification of the calling party;
a transmitter to send an instruction to the network, in response to receiving the indication from the user to deny the future call requests, instructing the network to automatically deny future call requests having the identification of the calling party; and
a processor configured to determine to display the prompt to the user on the display, in response to receiving the indication to deny the call request, regarding automatically denying the future call requests having the identification of the calling party, the determination based on a comparison of the calling party identification with a list of previous calling party identifications, a number of call requests previously received from the calling party identifier, and a length of one or more previous calls between the calling party and the portable communications device.

18. The portable communications device of claim 17, wherein the processor is further configured to determine to display the prompt to the user on the display, in response to receiving the indication to deny the call request, regarding automatically denying the future call requests having the identification of the calling party, the determination based on a comparison of the calling party identification with a list of contacts stored in the communications device.

19. The portable communication device of claim 18,
where the transmitter sends a notification to the network of the indication to deny the call request,
where the receiver receives an instruction from the network, in response to the notification of the indication to deny the call request, to display the prompt to the user regarding automatically denying the future call requests having the identification of the calling party; and
where the determination is based on the length of the one or more previous calls between the calling party and the portable communications device.

20. The portable communication device of claim 17, where the transmitter sends an instruction to the network instructing the network to deny future call requests automatically when identifications of calling parties are not associated with a whitelist of calling party identifications.

* * * * *